(12) United States Patent
Leys (10) Patent No.: US 11,280,429 B2
(45) Date of Patent: Mar. 22, 2022

(54) VALVE AND VALVE MEMBER FOR CONTROLLING FLUID FLOW

(71) Applicant: ENTEGRIS, INC., Billerica, MA (US)

(72) Inventor: John A. Leys, Chaska, MN (US)

(73) Assignee: ENTEGRIS, INC., Billerica, MA (US)

( * ) Notice: Subject to any disclaimer, the term of this patent is extended or adjusted under 35 U.S.C. 154(b) by 89 days.

(21) Appl. No.: 16/707,476

(22) Filed: Dec. 9, 2019

(65) Prior Publication Data

US 2020/0191300 A1 Jun. 18, 2020

Related U.S. Application Data

(60) Provisional application No. 62/781,365, filed on Dec. 18, 2018.

(51) Int. Cl.
*F16K 41/10* (2006.01)
*F16K 41/12* (2006.01)

(52) U.S. Cl.
CPC ............ *F16K 41/103* (2013.01); *F16K 41/12* (2013.01)

(58) Field of Classification Search
CPC .... F16K 41/103; F16K 41/12; F16K 27/0236; F16K 11/048; F16K 7/14; F16K 7/12; F16K 7/16; F16K 7/17; F16K 25/005; F16K 7/20
See application file for complete search history.

(56) References Cited

U.S. PATENT DOCUMENTS

| 2,665,105 | A | * | 1/1954 | Svabek, Jr. | ............. F16K 41/12 251/272 |
| 5,002,086 | A | | 3/1991 | Linder | |
| 5,865,423 | A | * | 2/1999 | Barber | .................... F16K 41/12 251/335.2 |
| 5,941,505 | A | * | 8/1999 | Nagel | ..................... F16K 41/12 251/335.2 |
| 6,378,548 | B1 | * | 4/2002 | Norton | .................... F16K 41/12 137/271 |
| 7,980,531 | B2 | * | 7/2011 | Myhrberg | ................. F16K 7/16 251/214 |
| 8,297,593 | B2 | * | 10/2012 | Muzzo | ................... F16K 1/302 251/332 |
| 2004/0084852 | A1 | * | 5/2004 | Tachikawa | ........ A61M 5/31513 277/534 |

(Continued)

FOREIGN PATENT DOCUMENTS

| JP | 2005163877 A | 6/2005 |
| JP | 2006125501 A | 5/2006 |

(Continued)

*Primary Examiner* — Marina A Tietjen
(74) *Attorney, Agent, or Firm* — Entegris, Inc.

(57) ABSTRACT

This application provides a valve member that includes a diaphragm portion and a valve head attachable to the diaphragm portion. The valve head includes an engagement portion configured to engage with a valve seat defined in the valve. The engagement portion is formed of a melt processable material that contains at least one fluoropolymer. The diaphragm portion is formed of a material that is non-melt processable and contains at least one fluoropolymer. This application also provides a valve that includes the valve member and a passageway with the valve seat. The valve head is configured to be moveable relative to the valve seat.

17 Claims, 7 Drawing Sheets

(56) References Cited

U.S. PATENT DOCUMENTS

| | | | | |
|---|---|---|---|---|
| 2009/0166574 A1* | 7/2009 | Hagihara | .............. | F16K 31/122 |
| | | | | 251/366 |
| 2010/0096578 A1* | 4/2010 | Franz | ...................... | F16K 41/12 |
| | | | | 251/318 |
| 2013/0284285 A1* | 10/2013 | Reifenberger | ........ | F16K 15/063 |
| | | | | 137/334 |
| 2015/0191561 A1* | 7/2015 | Kitagawa | ............ | C08F 214/262 |
| | | | | 526/247 |
| 2016/0169396 A1* | 6/2016 | Ishikawa | .............. | F16K 41/103 |
| | | | | 251/213 |

FOREIGN PATENT DOCUMENTS

| | | | |
|---|---|---|---|
| JP | 2017133558 A | | 8/2017 |
| JP | 3219317 U | | 11/2018 |

* cited by examiner

Figure 7

VALVE AND VALVE MEMBER FOR CONTROLLING FLUID FLOW

FIELD

This disclosure relates to valves for controlling a flow of fluid. More specifically, this disclosure relates to valves and valve members that control the flow of higher purity fluids.

BACKGROUND

Some manufacturing processes, such as photolithography and other chemical treatments in semiconductor manufacturing, utilize high purity fluids, such as liquids or gases. The materials and devices for transporting the high purity fluids by necessity are made with materials that do not adversely impact the purity of the high purity fluids. to Valves are often utilized in conveying systems as control mechanisms to deliver the high purity fluids. The advancements in semiconductor manufacturing require greater purity levels to enable manufacturing tolerances at the sub-10 nanometer scale. Thus, valves used for the delivery of high purity fluids must greatly reduce or eliminate particulate or contaminate generation when conveying high purity fluids through the valve.

SUMMARY

This disclosure is directed at a valve component that utilizes certain polymers for specific components of the valve assembly. The polymers provide distinct functions in the valve and are selected to perform over time while reducing, or preferably eliminating, the introduction of undesirable contaminants, such as particulate matter, into the fluid stream. A valve includes a valve body with an inlet and an outlet, a passageway for fluid to flow from the inlet to the outlet, and a valve member. The valve member includes a diaphragm portion and a valve head. The valve head has an open position and a closed position and is configured to be moved between the open position and closed position to control the flow rate of fluid through the passageway.

Embodiments for a valve and valve member are disclosed. In some embodiments, an engagement portion of the valve head is made of a melt processable material containing one or more fluoropolymers. The diaphragm portion is made of a material that is non-melt processable and contains one or more fluoropolymers.

The melt processable material of the engagement portion may contain at least one of perfluoroalkoxy alkane (PFA) and fluorinated ethylene propylene (FEP). In an embodiment, the melt processable material is a material having a melt flow rate of at least 0.4 g/10 min.

The non-melt processable material of the diaphragm portion may contain at least one of polytetrafluoroethylene ("PTFE"), and modified polytetrafluoroethylene ("MPTFE"), ethylene tetrafluoroethylene ("ETFE").

In an embodiment, the valve body includes a groove and the diaphragm portion includes an insert that is receivable in a groove to form a seal between the passageway and a space on an opposite side of the diaphragm portion.

BRIEF DESCRIPTION OF THE DRAWINGS

References are made to the accompanying drawings that form a part of this disclosure, and which illustrate embodiments in which the valve and valve member described in this specification can be practiced.

Like reference numbers represent like parts throughout.

DETAILED DESCRIPTION

A valve is configured to control a flow of fluid which may be a gas, liquid, or a combination thereof. The flow path of the valve is configured to be chemically resistant. When the valve is open, fluid flows through a passageway in the valve. The valve includes a valve member configured to block (partially or fully) an opening in the passageway to control the flow of the fluid. The valve member contacts at least one surface of the valve body (e.g., a surface of the passageway) when it blocks the passageway. This contact causes rubbing of the valve member, which can cause particle generation. The generated particles negatively impact the purity of the fluid flowing through the valve as they are carried away with the fluid. The valve member of this disclosure can prevent such generation of particles.

The valve member is also configured to prevent the fluid from leaking from the passageway into other spaces of the valve member. The valve member includes a flexible diaphragm that flexes with the moving parts of the valve member. The diaphragm is chemically resistant as it contacts the fluid flowing through the valve. As the valve member is cycled open and closed, the flexible diaphragm must flex with each opening and closing movement.

Embodiments described herein relate to valves and valve members. A valve includes a valve member having a valve head and a diaphragm portion. The valve head is configured to be moved between an open and closed position. In the closed position, the valve head is configured to block a flow of fluid through the valve. An engagement portion of the valve head is configured to contact opposing surface(s) when the valve head is in the closed position. The diaphragm portion is connected to the valve head and is configured to form a seal preventing fluid from leaking from the passageway.

Certain embodiments disclosed herein may have an engagement portion made of a material that is chemically resistant to corrosive fluids. Additionally, the engagement portion reduces or preferably eliminates particle generation over the service life of the valve. The diaphragm portion is made of a material that can flex with the valve head, is chemically resistant to corrosive fluids, and is able to maintain its seal over a large number of open-closed cycles of the valve head. This form of polymer component can offer enhanced durability over conventional valve components having a diaphragm and valve head made entirely with a single polymer.

Figure 1:
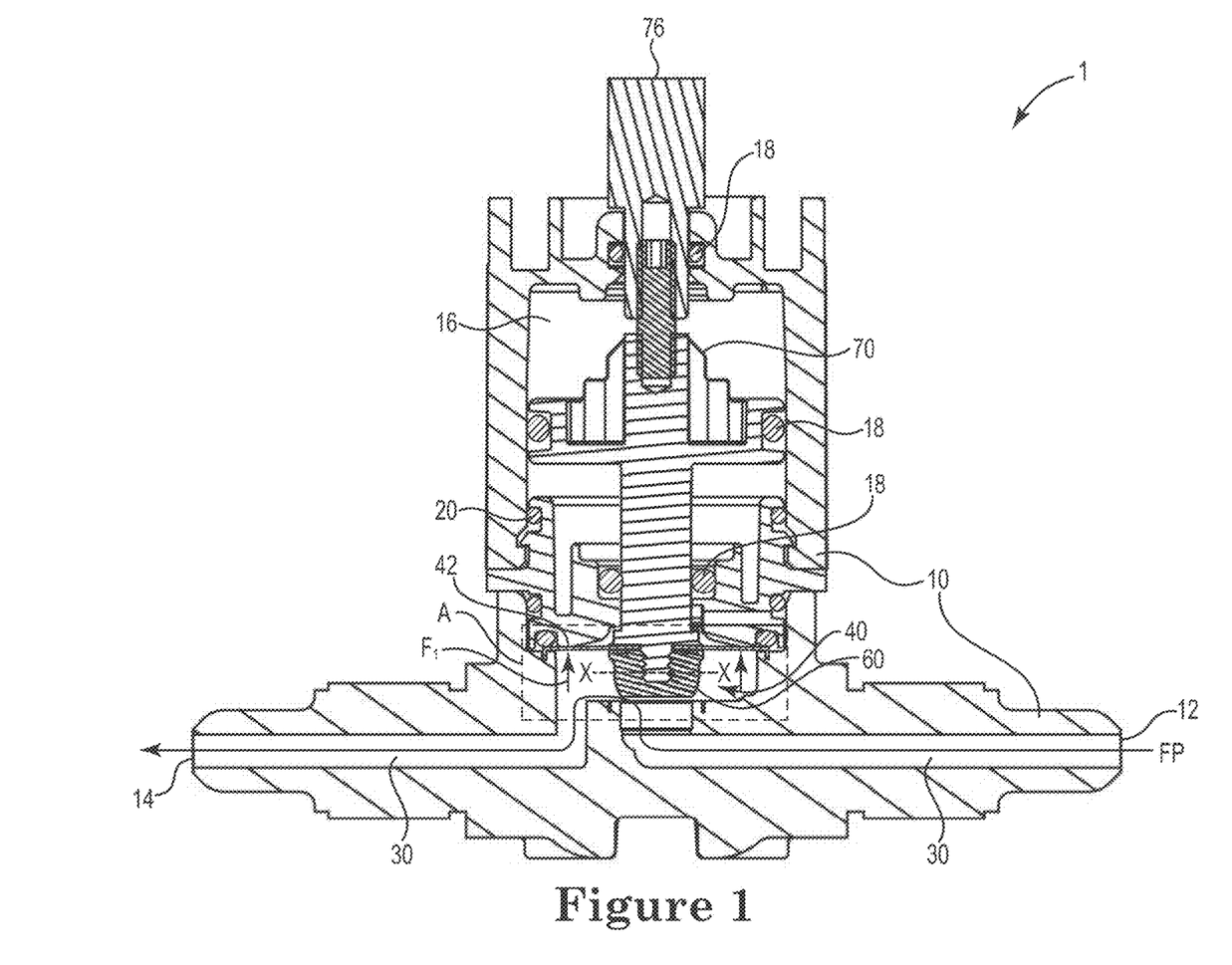
FIG. 1 is a cross-sectional view of a valve according to an embodiment.
Figure 2:
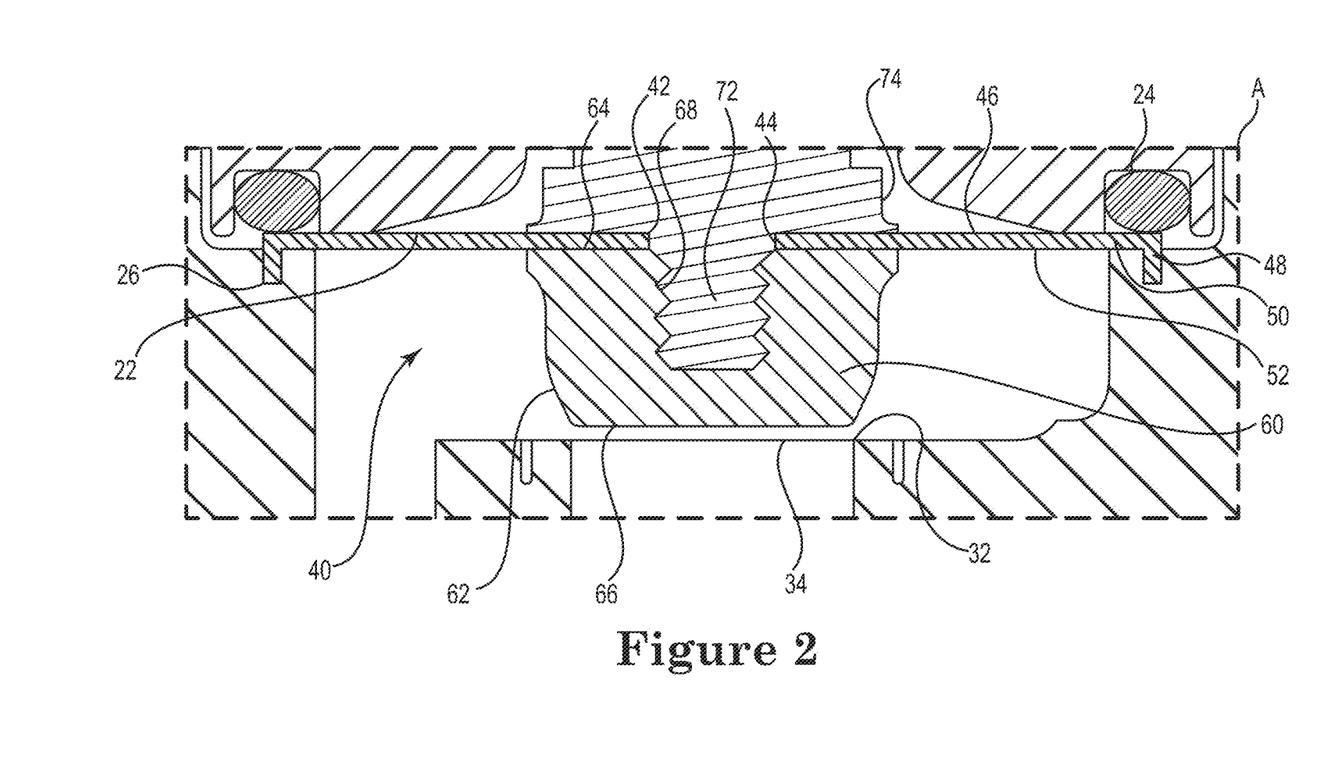
FIG. 2 is a magnified view of the area A in FIG. 1.
Figure 3:
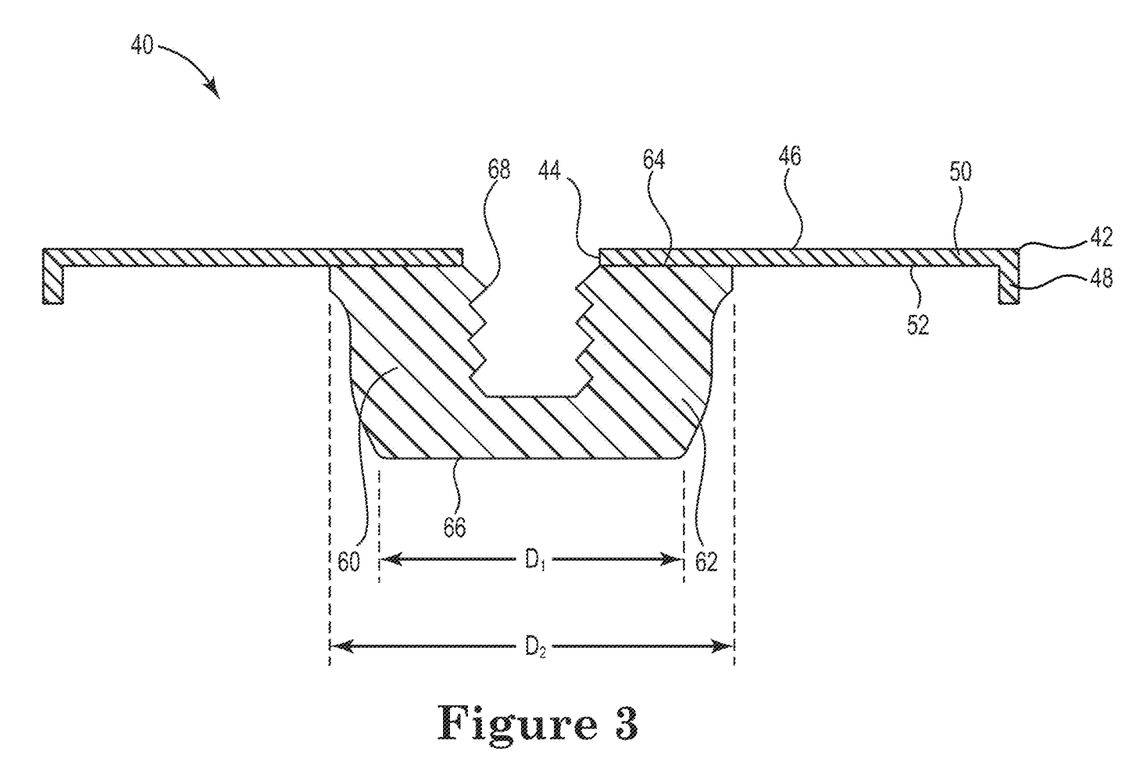
FIG. 3 is a cross-sectional view of the valve member in FIG. 1.

FIG. 1 is a cross-sectional view of a valve 1 according to an embodiment. FIG. 2 shows a magnified view of the area A in FIG. 1. The valve 1 includes a valve body 10, a valve member 40, and a valve stem 70. FIG. 3 depicts a cross-sectional view of the valve member 40. The valve body 10 includes an inlet 12 and an outlet 14. A passageway 30 extends through the valve 1 from the inlet 12 to the outlet 14. Fluid flows through the valve 1 by passing through the passageway 30. A flow path FP of the fluid through the valve 1 is shown in FIG. 1.

The valve member 40 includes a diaphragm portion 42 and a valve head 60. The diaphragm portion 42 and valve head 60 each have a similar shape in a cross section perpendicular to the view in FIG. 1 (e.g., in a direction into the page of FIG. 1), respectively. Accordingly, a shape of the valve head 60 along the line X-X in FIG. 1 is oval or circular, and the shape of the diaphragm portion 42 is oval or circular. However, it should be appreciated the shape of the valve head 60 and diaphragm portion 42 in an embodiment may be different.

Figure 4:
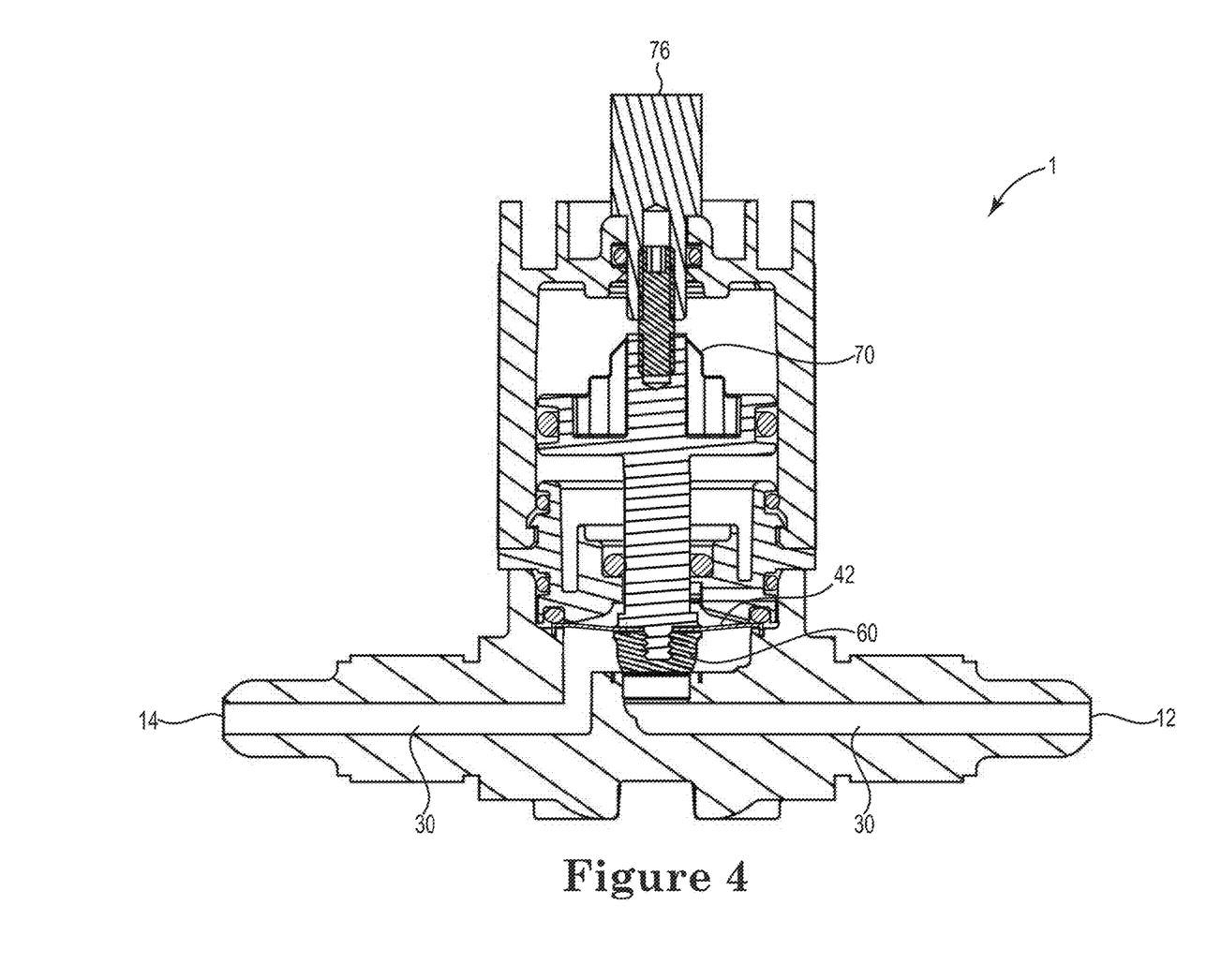
FIG. 4 is a cross-sectional view of the valve in FIG. 1 when a valve head is in a closed position.

As shown in FIG. 2, the passageway 30 includes a valve seat 32. The valve head 60 is moveable relative to a valve seat 32 to control the flow of fluid through the valve 1. The valve head 60 has an open position and a closed position. FIG. 1 shows the valve head 60 in the open position. FIG. 4 shows the valve head 60 in a closed position. The valve head 60 includes an engagement portion 62 that is configured to contact the valve seat 32 when the valve head 60 is in the closed position. The engagement portion 62 contacts the valve seat 32 such that the valve head 60 blocks the flow of fluid through the passageway 30.

As shown in the embodiments of FIGS. 2 and 3, the valve head 60 has a first end 64 and a second end 66. The first end 64 is connected to the diaphragm portion 42. The second end 66 is farther from the diaphragm portion 42 than the first end 64. The second end 66 has a diameter $D_1$ that is smaller than the diameter $D_2$ of the first end 64. The valve head 60 is tapered towards the second end 66. When the fluid flowing through the passageway 30 has a higher temperature, the higher temperature may cause the valve head 60 to slightly deform. However, the tapering of the second end 66 allows the valve head 60 to be inserted into an opening 34 of the passageway 30. The valve head 60 being inserted into the opening 34 of the passageway allows for more contact between the engagement portion 62 and the valve seat 32 and helps to prevent slight deformations of the valve head 60 from causing leaks between the valve head 60 and the valve body 10 when the valve head 60 is in the closed position.

As shown in FIG. 1, the valve body 10 also includes a retaining space 16, O-rings 18, and a retaining mechanism 20. The valve stem 70 includes a screw portion 72 and a flange 74. The valve stem 70 is connected to the valve head 60 by the screw portion 72 of the valve stem 70 being screwed into a threaded hole 68 of the valve head 60. As shown in FIG. 2, the valve stem 70 extends through an aperture 44 in the diaphragm member 42 to directly connect to the valve head 60. However, it should be understood that the valve stem 70 may be attached to the valve head 60 in a different manner than the manner shown in FIGS. 1, 2, and 4. In an embodiment, the valve head 60 may extend through the aperture 44 of the diaphragm member 42 instead of the valve stem 70. In an embodiment, the valve head 60 and valve stem 70 may be connected by being configured to snap together instead of being screwed together.

As shown in FIGS. 1, 2, and 4, the diaphragm portion 42 is connected to the valve head 60 by being compressed between the valve head 60 and the valve stem 70. The pinching of the diaphragm portion 42 forms a seal that prevents the fluid in the passageway 30 from flowing between the diaphragm portion 42 and the valve head 60. However, it should be appreciated that the valve head 60 and diaphragm portion 42 may be connected in a different manner than the manner shown in FIGS. 1, 2, and 4. In an embodiment, the diaphragm portion 42 may bonded to the head valve 60. For example, the bonding may be performed by welding.

The valve stem 70 extends through the retaining space 16. The valve stem 70 has an end 76 that extends outside of the valve body 10. The O-rings 18 are provided to allow the valve stem 70 to move relative to the valve body 10. The valve 1 may include one or more O-rings 18 as suitable or desired to allow movement of the valve stem 70 and/or provide sealing. A force is applied through the end 76 of the valve stem 70 to move the valve head 60 between the open and closed position. However, the valve 1 in an embodiment may be operated using pressurized gas. In such an embodiment, the valve body 10 may include a hole, and pressurized gas may be forced into the retaining space 16 to apply the force to the valve stem 70 to move the valve head 60.

The retaining mechanism 20 contacts an upper surface 46 of the diaphragm portion 42. The retaining mechanism 20 is configured to help restrict the movement of the diaphragm portion 42. As shown in FIG. 2, the retaining mechanism 20 includes a support surface 22 that contacts and supports the diagram portion 42 when the valve head 60 is in the open position.

The diaphragm portion 42 also includes an insert 48 located near the outer side 50 of the diaphragm portion 42. A groove 26 in the valve body 10 is configured to receive the insert 48 to form a seal to prevent fluid in the passageway 30 from flowing between the valve body 10 and the diaphragm portion 42. The retaining mechanism 20 applies a force to the upper surface 46 of the diaphragm portion 42 to prevent the insert 48 from being pushed out of the groove 26. In FIG. 1, the retaining mechanism 20 includes an O-ring 24 that applies the force to the upper surface 46 of the diaphragm portion 42 above the insert 48. However, the retaining mechanism 20 in an embodiment may utilize a different surface or structure to apply the force to the upper surface 46 of the diaphragm portion 42 above the groove 26.

When fluid flows through the passageway 30, it flows along the valve head 60 and the lower surface 52 of the diaphragm portion 42. The diaphragm portion 42 extends from the valve head 60 to the valve body 10. The diaphragm portion 42 is configured to form a seal between the valve head 60 and the valve body 10 that prevents fluid from flowing into the retaining space 16 from the passageway 30.

As shown in FIG. 1, as fluid flows through the passageway 30, the fluid applies a force $F_1$ against the diaphragm portion. In particular, the force $F_1$ is applied to the lower surface 52 of the diaphragm portion 42. When the valve head 60 is in the closed position, the force $F_1$ against the diaphragm portion 42 may be a back-pressure applied via the outlet 14. The groove 26, insert 48, and retaining mechanism 20 advantageously provide a stronger seal between the valve body 10 and the diaphragm portion 42 to prevent the fluid in the passageway from flowing into the retaining space 16. In particular, the diaphragm portion 42 has a configuration that allows it to provide sealing when the force $F_1$ is up to 80 psi.

The diaphragm portion 42 can be formed of a material containing one or more fluoropolymers. The material of the diaphragm portion 42 may be a non-melt processable polymer. In an embodiment, the diaphragm portion 42 is a material containing at least one of polytetrafluoroethylene (PTFE), modified polytetrafluoroethylene (MPTFE), and ethylene tetrafluoroethylene (ETFE). In an embodiment, the non-melt processable material of the diaphragm portion 62 is single type of fluoropolymer (e.g., PTFE, MPTFE, ETFE.

In an embodiment, the MPTFE contains 5 wt % or less but more than 0 wt % of the modified tetrafluoroethylene groups. In another embodiment, the MPTFE contains 3 wt % or less but more than 0 wt % of the modified tetrafluoroethylene groups. In another embodiment, the MPTFE contains 2 wt % or less but more than 0 wt % of the modified tetrafluoroethylene groups.

As shown by comparing FIGS. 1 and 4, the diaphragm portion 42 flexes when the valve head 60 is moved between the open and closed positions. This flexion of the diaphragm portion 42 causes the diaphragm portion 42 to wear. In some embodiments, the material of the diaphragm portion 42 allows the diaphragm portion 42 to have an extended service life. In some embodiments, the diaphragm portion 42 may have a service life of 1 million cycles or greater, or even 10 million cycles or greater.

An MIT flex life of the flexible components of the valve may be determined, for example, using a MIT folding endurance tester (e.g., MIT Flex Tester-MIT Folding Endurance Tester with a Hang Type Weight produced by Qualitest, Huntsville, Ala.). The number of times the load is applied to the test material before the test material fractures is the MIT flex life of the test material. For example, the MIT flex life of a material may be determined according to ASTM standard D2176. In certain embodiments, the non-melt processable material has a MIT flex life of at least 1 million, at least 2 million, or at least 10 million.

The engagement portion 62 of the valve head 60 as shown in FIG. 3 is formed of a melt processable material containing one or more fluoropolymers. In an embodiment, the melt processable material has an MFR of at least 0.4 g/10 min. In an embodiment, the melt processable material has an MFR of at least 2.5 g/10 min. In an embodiment, the melt processable material has an MFR of at least 5.0 g/10 min. In an embodiment, the melt processable material has an MFR of at or less than 50 g/10 min. The MFR of a material may be determined, for example, using a melt flow rate indexer (e.g., Melt Indexer Tester Model 7053 produced by Kayeness, Honey Brook, Pa.). The melt flow rate indexer may utilize, for example, an orifice having radius of 0.1048 mm and a length of 0.800 mm. For example, the material may be tested at a temperature of 372° C. and with an applied load of 4900 g. For example, the MFR of a material may be determined according to ASTM standard D1238.

For example, melt processable materials having a higher MFR (e.g., relative to non-melt processable materials) provide higher resistance to wear. Further, melt processable materials with a higher MFR can be injection molded and therefore result in a smooth outer surface (e.g., relative to non-melt processable materials). For example, the smooth outer surface of the melt processable material generates fewer particles compared to outer surfaces provided by non-melt processable materials (e.g., surfaces formed by machining). Thus, melt processable materials with a larger MFR may advantageously reduce or inhibit particle generation at the valve 1.

In an embodiment, the melt processable material of the engagement portion 62 contains at least one of perfluoroalkoxy alkane (PFA) and fluorinated ethylene propylene (FEP). In an embodiment, the melt processable material contains at least the PFA. In an embodiment, the alkoxy group of the PFA is a $C_{1-6}$ alkoxy group. In another embodiment, the alkoxy group of the PFA is a $C_{1-5}$ alkoxy group. In another embodiment, the alkoxy group of the PFA is a $C_{1-3}$ alkoxy group. In an embodiment, the melt processable material of the engagement portion 62 is single type of fluoropolymer (e.g., PFA, FEP).

In an embodiment, the melt processable material of the engagement portion 62 is a MIT flex life of about 500,000 or less. The MIT flex life may be determined, for example, in the same manner as discussed above regarding the non-melt processable material of the diaphragm portion 42. In an embodiment, the MIT flex life of the non-melt processable material of the diaphragm portion 42 is at least twice as great as the MIT flex life of the melt processable material of the engagement portion 62. In an embodiment, the MIT flex life of the non-melt processable material of the diaphragm portion 42 is at least three times greater than the MIT flex life of the melt processable material of the engagement portion 62.

Figure 5:
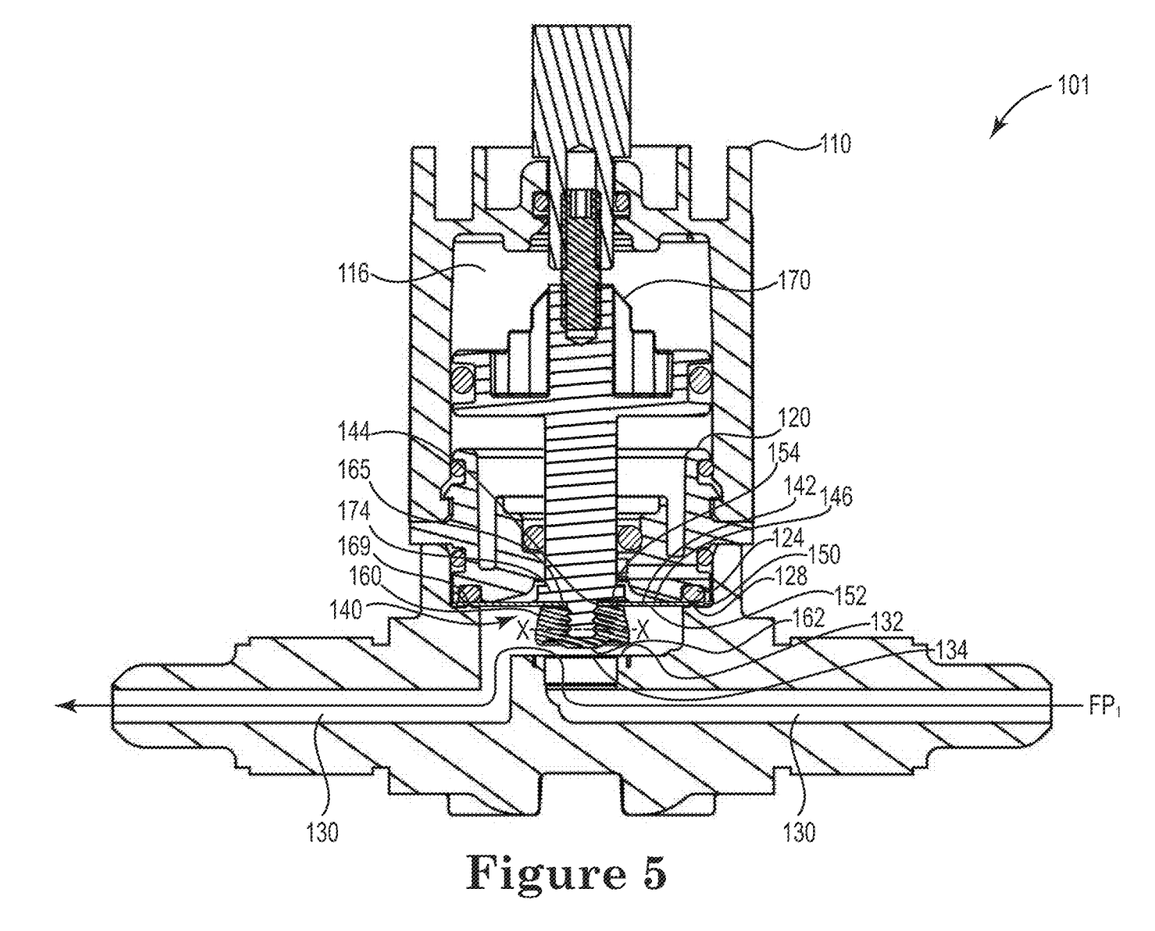
FIG. 5 is a cross-sectional view of valve according to another embodiment.

FIG. 5 is a cross-sectional view of a valve 101 according to an embodiment. The valve 101 is the same as the valve 1 in FIG. 1, except with respect to a valve member 140 and the connection of the valve member 140 to the valve body 110. For example, the valve 101 includes valve body 110, a passageway 130, and a valve stem 170 for moving a valve head 160 similar to the valve 1 in FIGS. 1, 2, and 4. FIG. 5 illustrates a flow path $FP_1$ for fluid flowing through the valve 101. The valve member 140 includes a diaphragm portion 142 and the valve head 160. The diaphragm portion 142 and the valve head 160 each have a similar shape in a cross section perpendicular to the view in FIG. 5 (e.g., in a direction into the page in FIG. 5), respectively. Accordingly, a shape of the valve head 160 along the line $X_1$-$X_1$ in FIG. 5 is oval or circular, and a shape of the diaphragm portion 142 is oval or circular. However, the valve head 160 and diaphragm portion 142 may have a different shape in an embodiment.

The passageway 130 includes a valve seat 132. The valve seat 132 in FIG. 5 is a generally flat surface. The valve head 160 includes an engageable portion 162 configured to engage the valve seat 132 when the valve head 160 is in the closed position. The valve head 160 is in an open position in FIG. 5. The engageable portion 162 contacts the valve seat 160 when in the closed position. The valve head 160 blocks the passageway 130 by covering an opening 134 of the passageway 130. The engagement portion 162 of the valve head 160 is made of the same material as discussed above for the engagement portion 62 in FIGS. 1-4.

As shown in FIG. 5, the bottom of the engageable portion 162 has a dome shape. When the valve head 160 is lowered to block the opening 134, the outer diameter of the engageable portion 162 contacts the valve seat 132. This allows the valve head 160 to cover the opening 134 and block the passageway 130 while also minimizing contact between the valve head 160 and the valve seat 132. Minimizing contact between the valve head 160 and the valve seat 132 can reduce wear on the engageable portion 162 and lowers particle generation caused by such wear.

The diaphragm portion 142 extends between the valve head 160 and the valve body 110. The diaphragm portion 142 is configured to provide a seal between the valve head 160 and the valve body 110 to prevent the fluid in the passageway 130 from flowing into a retaining space 116 of the valve 101. The diaphragm portion 142 includes an aperture 144, an outer part 150, and an inner part 154. The aperture 144 is located along the inner part 154. The diaphragm portion 142 is flexible so that its inner part 154 can move relative to its outer part 150 with the movement of the valve head 160. The diaphragm portion 142 is made of the same material as discussed above for the diaphragm portion 42 in FIGS. 1-4.

The diaphragm portion 142 is compressed between the valve head 160 and the valve stem 170. More specifically, the inner part 154 of the diaphragm portion 142 is compressed between the valve head 160 and a flange 174 of the valve stem 170. The diaphragm portion 142 is also compressed between the valve body 110 and a retaining mechanism 120. More specifically, the outer part 150 of the diaphragm portion 142 is compressed between the valve body 110 and the retaining mechanism 120. The valve body 110 includes a retaining ridge 128 that contacts the diaphragm portion 142. The retaining ridge 128 is provided to help pinch the diaphragm portion 142 and prevent the diaphragm portion 142 from slipping away from between the valve body 110 and the retaining mechanism 120. The retaining mechanism 120 includes an O-ring 124 for applying a force to pinch the diaphragm portion 142. However, the retaining mechanism 120 in an embodiment may include a different surface that applies the force to the upper surface 146 of the diaphragm portion 142 as similarly discussed above regarding the retaining mechanism 20 in FIG. 1. In an embodiment, diaphragm portion 142 may include an insert (e.g., insert 48) and the valve body 110 may include a groove (e.g., groove 26) similar to the valve 1 in FIG. 1.

The diaphragm portion 142 is connected to the valve head 160 by being compressed between the valve head 160 and the valve stem 170. However, the diaphragm portion 142 may be connected to the valve head in a different manner as similar discussed above regarding the diaphragm portion 42 in FIG. 1.

The valve head 160 includes a surface 165 that contacts the lower surface 152 of the diaphragm portion 142. The surface 165 includes a retaining ridge 169. The retaining ridge 169 helps pinch the diaphragm portion 142 between the valve head 160 and the valve stem 170 to prevent the diaphragm portion 142 from slipping out from between the valve head 160 and the valve stem 170. In an embodiment, the valve member 1 in FIG. 1 may also include one or more of the retaining ridges 128, 169 of the valve 101. It should be understood that the diaphragm portion 142 and valve head 160 may be connected in a different manner than the manner shown in FIG. 5 as similarly discussed above regarding the diaphragm portion 42 and valve head 60 in FIGS. 1-4.

The valve stem 170 is directly connected to the valve head 160 through an aperture 144 in the diaphragm portion 142. The valve stem 170 and valve head 160 in FIG. 4 are connected by being screwed together similar to the valve stem 70 and valve head 60 in FIGS. 1, 2, and 4. However and, it should be appreciated that the valve stem 170 and the valve head 160 in FIG. 5 may be attached in a different manner as similarly discussed regarding the valve stem 70 and valve head 60 in FIGS. 1-4.

Figure 6:
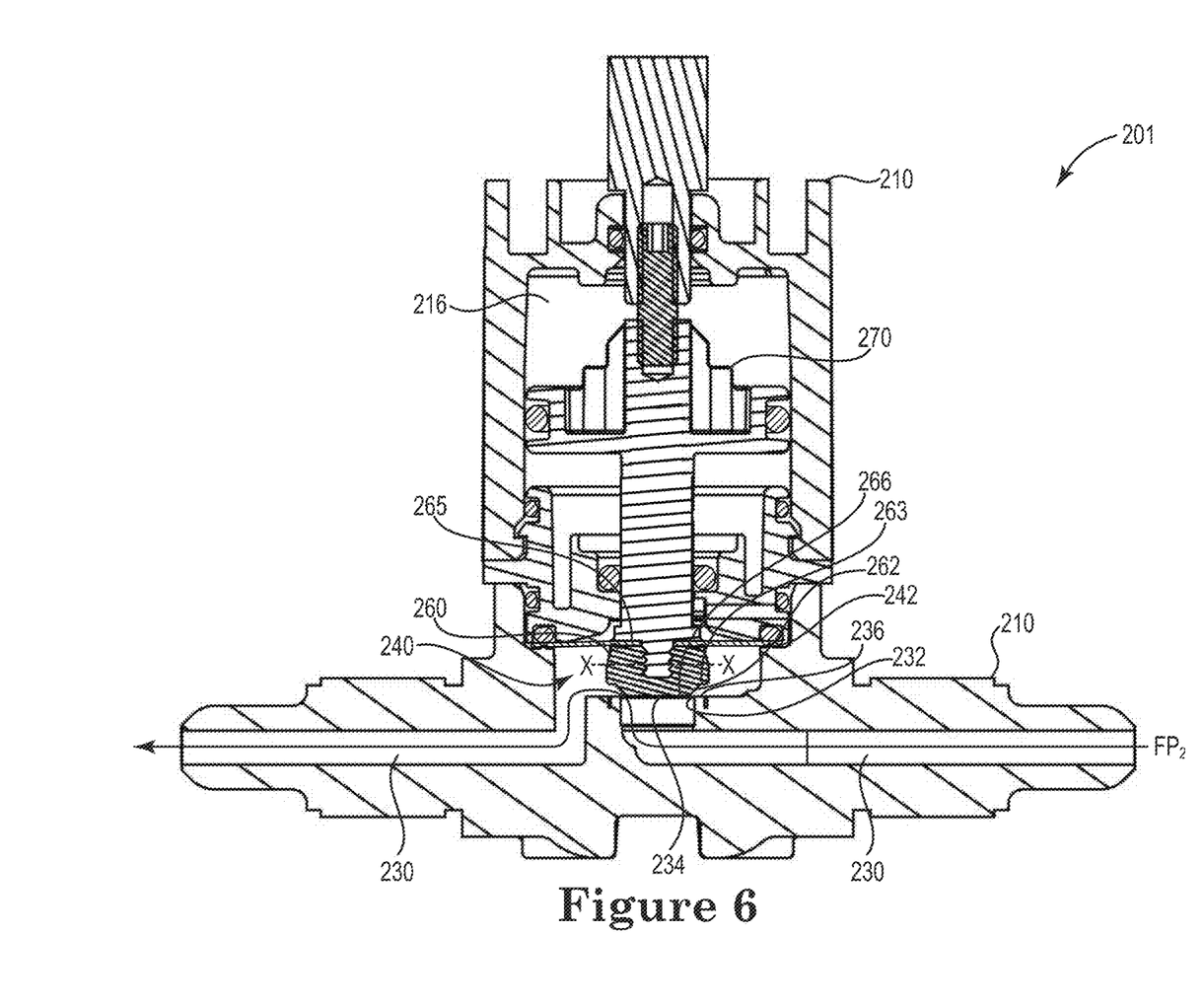
FIG. 6 is a cross-sectional view of valve according to another embodiment.

FIG. 6 is a cross-sectional view of valve 201 according to an embodiment. The valve 201 has a similar configuration as the valve 101 in FIG. 5, except with respect to the configuration of a valve head 260. For example, the valve 201 includes a valve body 210, a passageway 230, a diaphragm portion 242, and a valve stem 270 similar to the valve 101 in FIG. 5. A flow path $FP_2$ for fluid flowing through the valve 201 is also illustrated in FIG. 6. The valve 201 includes a valve member 240. The valve member 240 includes the diaphragm portion 242 and the valve head 260. The diaphragm portion 242 and the valve head 260 each have a similar shape in a cross section perpendicular to the view in FIG. 6 (e.g., in a direction into the page of FIG. 6), respectively. Accordingly, a shape of the valve head 260 along the line $X_2$-$X_2$ in FIG. 6 is oval or circular, and a shape of the diaphragm portion 242 is oval or circular. However, the valve head 260 and diaphragm portion 242 may have a different shape in an embodiment.

The passageway 230 includes a valve seat 232 with a top surface 236 that extends around an opening 234 of the passageway 230. As shown in FIG. 6, the top surface 236 of the valve seat 242 is generally flat. The valve head 260 includes an engageable portion 262 that is configured to engage the valve seat 232 when the valve head 260 is in the closed position. The engageable portion 262 contacts the valve seat 232 when the valve head 260 is in the closed position. The engageable portion 262 includes a contacting surface 263 configured to lay flat against the top surface 236 of the valve seat 232. The contacting surface 263 can ensure better sealing between the engageable portion 262 and valve seat 232. The engageable portion 262 also includes an end 266 that is configured to be inserted into the opening 234 of the passageway 230. The valve head 260 blocks the passageway 230 by being inserted into the opening 234 and the contacting surface 263 contacting the valve seat 232. The engagement portion 262 is made of the same material as discussed above for the engagement portion 62 in FIGS. 1-4.

The diaphragm portion 242 extends between the valve head 260 and the valve body 210. The diaphragm portion 242 is configured to form a seal between the valve head 260 and the valve body 210 to prevent the fluid in the passageway 230 from flowing into a retaining space 216 of the valve 201. The diaphragm portion 242 is flexible so that it can flex with the movement with valve head 260. The diaphragm portion 242 is made of the same material as discussed above for the diaphragm portion 42 in FIGS. 1-4.

The diaphragm portion 242 is connected to the valve head 260 by being compressed. However, the diaphragm portion 242 may be connected to the valve head 260 in a different manner as similar discussed above regarding the diaphragm portion 42 in FIGS. 1, 2, and 4. The valve stem 270 is directly connected to the valve head 260. The valve stem 270 and valve head 260 in FIG. 6 are screwed together in a similar manner as the valve stem 70 and valve head 60 in FIG. 1. However, it should be appreciated that the valve stem 270 and the valve head 260 may be attached in a different manner than shown in FIG. 6 as similarly discussed above regarding the valve stem 70 and valve head 60 in FIG. 1.

Figure 7:
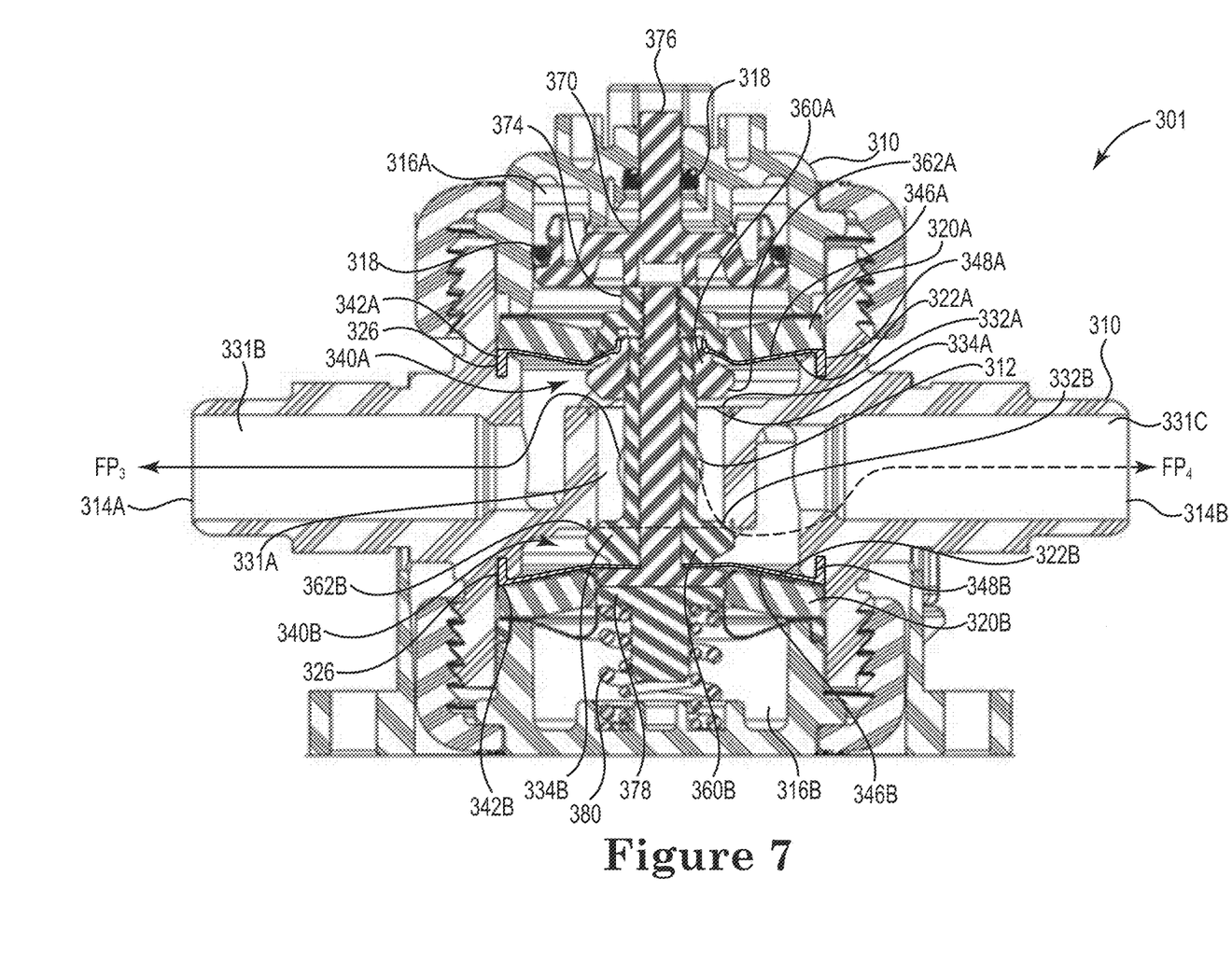
FIG. 7 is a cross-sectional view of a three-way valve according to another embodiment.

FIG. 7 is a cross section of valve 301 according to an embodiment. The valve 301 in FIG. 7 is a three-way valve. The valve includes a valve body 301, two valve members 340A, 340B, and a valve stem 370. The valve body includes an inlet 312, a first outlet 314A, and a second outlet 314B. A passageway 330 extends from between the inlet 312, the first outlet 314A, and the second outlet 314B. The passageway 330 having a first section 331A that extends from the inlet 312 to two valve members 340A, 340B, a second section 331B that extends from the first valve member 340A to the first outlet 314A, and a third section 331C that extends from the second valve member 340B to the second outlet 314B. As shown in FIG. 7, the valve 301 is configured to have two flow paths $FP_3$, $FP_4$ for fluid to flow through the valve 310. The first flow path $FP_3$ extends from the inlet 312 to the first outlet 314A. The second flow path $FP_4$ extends from the inlet 312 to the second outlet 314B. The second flow path $FP_4$ is in dashed in FIG. 7 as it is blocked off by the second valve member 340B that is in its closed position.

The passageway 330 includes a first valve seat 332A and a second valve seat 332B. The first valve seat 332A is located along an opening 334A of the passageway 330 that is between the first section 331A and second section 331B of the passageway 330. The second valve seat 332B is located along an opening 334B in the passageway 330 that is between the first section 331A and the third section 331C of the passageway 330.

The first valve member 340A includes a first diaphragm portion 342A and a first valve head 360A. The first valve head 340A is moveable relative to the first valve seat 332A to control flow of the fluid to the first outlet 314A via the first flow path $FP_3$. The second valve member 340B includes a second diaphragm portion 342B and a second valve head 360B. The second valve head 360B is moveable relative to the second valve seat 332B to control of flow the fluid to the second outlet 314B via the second flow path $FP_3$. Each of the first valve head 340B and second valve head 340B is moveable relative to its corresponding valve seat 332A, 332B between an open position and a closed position, respectively. In FIG. 7, the first valve member 360A is in the open position, and the second valve member 360B is in the closed position.

Each of the valve heads 360A, 360B includes a respective engagement portion 362A, 362B configured to contact their respective valve seats 332A, 332B when in the closed position. Each valve head 360A, 360B when in its closed position is configured to block the passageway 330. The first valve 360A head configured to block the opening 334A along the first flow path $FP_3$, and the second valve head 360B configured to block the opening 334B along the second flow path $FP_4$. Each valve head 360A, 360B also has an end opposite to its diaphragm portion 342A, 342B that is tapered similar to the valve head 60 in FIG. 1. In an embodiment, each or both of the valve heads 360A, 360B may have an engagement portion 362A, 362B similar to one of the valve heads 60, 160, 260 in FIG. 1, 6, or 7. The engagement portion 362A, 362B of each valve head 360A, 360B is made of the same material as discussed above for the engagement portion 60 in FIGS. 1-4, respectively.

The valve body 310 includes a retaining space 316A, 316B adjacent to each valve member 340A, 340B, O-rings 318 for allowing movement of the valve stem 370 relative to the valve body 310, a retaining mechanism 320A, 320B disposed along each valve member 340A, 340B, and a spring 380. The spring 380 is configured to bias the first and second valve heads 360A, 360B. The spring 380 biases the first valve head 360A to the open position and the second valve head 360B to the closed position. The valve stem 370 includes a flange 374 and an end cap portion 376. The first diaphragm portion 342A is compressed between the valve stem 374 and the first valve head 360A, and the second diaphragm portion 342B is compressed between the valve stem 370 and the second valve head 360B. More specifically, the first diaphragm portion 342A is compressed between the flange 374 and the first valve head 360A, and the second diaphragm portion 342B is compressed between the end cap portion 378 and the second valve head 360B. Each of the first and second diaphragm portions 342A, 342B has an insert 348A, 348B that is inserted into a respective groove 326 of the valve body 310. Each of the retaining mechanisms 320A, 320B has a support surface 322A, 322B that supports its respective diaphragm portion 342A, 342B. The support surface 322A, 322B also applies a force to an outer surface 346A, 346B of their respective diaphragm portions 342A, 342B to ensure the insert 348A, 348B of each diaphragm portion 342A, 342B remains in its corresponding groove 326.

The first diaphragm portion 342A is configured to form a seal between the first valve head 360A and the valve body 310 to prevent fluid from flowing from the passageway 330 into the retaining space 316A adjacent to the first valve member 340A. The second diaphragm 342B is configured to form a seal between the second valve head 360B and the valve body 310 to prevent fluid from flowing from the passageway 330 into the retaining space 316B adjacent to the second valve member 340B. The first and second diaphragm portions 342A, 342B are each made of the same material as discussed above for the diaphragm portion 42 in FIGS. 1-4, respectively.

The valve stem 370 extends through the retaining spaces 316A, 316B and has an end 376 that extends outside of the valve body 310. The valve stem 370 extends through both valve heads 360A, 360B. When a force is applied to the end 376 of the valve stem 370, the valve stem 370 applies a force to counter the spring 380 and to push the second valve head 360A away from the second valve seat 334A. The valve stem 370 is configured to move both valve heads 360A, 360B between their open and closed positions.

ASPECTS

Any of aspects 1-13 can be combined with any of aspects 14-27, and any of aspects 14-22 can be combined with any of aspects 23-27.

Aspect 1. A valve for controlling a flow of fluid, comprising:
a valve body comprising an inlet and an outlet for the fluid;
a passageway for the fluid that extends from the inlet to the outlet, the passageway comprising a valve seat; and
a valve member comprising a diaphragm portion and a valve head attached to the diaphragm portion, the diaphragm portion comprising at least one polymer selected from the group consisting of polytetrafluoroethylene (PTFE), modified polytetrafluoroethylene (MPTFE), and ethylene tetrafluoroethylene (ETFE), and the valve head comprising an engagement portion engageable with the valve seat, the engageable portion of the valve head comprising at least one polymer selected from the group consisting of perfluoroalkoxy alkane (PFA) and fluorinated ethylene propylene (FEP),
wherein the valve head is moveable between an open position and a closed position relative to the valve seat.

Aspect 2. The valve aspect 1, further comprising a valve stem attached to the valve member.

Aspect 3. The valve of either one of aspects 1 or 2, wherein the valve stem comprises a flange engageable with an upper surface of the diaphragm portion.

Aspect 4. The valve of any one of aspects 1-3, wherein the diaphragm portion includes an aperture and the valve stem extends through the aperture and is connected directly to the valve head.

Aspect 5. The valve of any one of aspects 1-4, wherein the valve head comprises a first end connected to the diaphragm portion and a second end located farther away from the diaphragm portion, and
wherein a diameter at the first end of the valve head is smaller than a diameter at the second end of the valve head.

Aspect 6. The valve of any one of aspects 1-5, wherein the valve head comprises a first end connected to the diaphragm portion and a second end located farther away from the diaphragm portion, and
wherein the valve head is tapered in a direction toward the second end.

Aspect 7. The valve of any one of aspects 1-6, wherein the valve body comprises a groove, and the diaphragm portion comprises an insert receivable in the groove to form a seal between the passageway located on one side of the diaphragm portion and a space on an opposite side of the diaphragm portion.

Aspect 8. The valve of any one of aspects 1-7, wherein the at least one polymer selected from the group consisting of PFA and FEP is a melt processable material.

Aspect 9. The valve of any one of aspects 1-8, wherein the at least one polymer selected from the group consisting of PFA and FEP has a melt flow rate of 0.4 g-50 g/10 min.

Aspect 10. The valve of any one of aspects 1-9, wherein the valve body comprises a retaining mechanism in contact with an upper surface of the diaphragm portion to restrict movement of the diaphragm portion.

Aspect 11. The valve of any one of aspects 1-10, wherein the PFA comprises a $C_{1-6}$ alkoxy group.

Aspect 12. The valve of any one of aspects 1-10, wherein the PFA comprises a $C_{1-3}$ alkoxy group.

Aspect 13. The valve of any one of aspects 1-12, wherein the MPTFE includes modified tetrafluoroethylene groups and unmodified tetrafluoroethylene groups, the MPTFE containing 5 wt % or less of the modified tetrafluoroethylene groups.

Aspect 14. A valve member for a valve, comprising:
a diaphragm portion comprising one of polytetrafluoroethylene (PTFE), modified polytetrafluoroethylene (MPTFE), and ethylene tetrafluoroethylene (ETFE); and
a valve head attachable to the diaphragm portion, the valve head comprising an engagement portion configured to engage with a valve seat defined in the valve, the engageable portion of the valve head comprising one of perfluoroalkoxy alkane (PFA) and fluorinated ethylene propylene (FEP).

Aspect 15. The valve member of aspect 14, wherein the diaphragm portion includes an aperture and the valve stem extends through the aperture and is connected directly to the valve head.

Aspect 16. The valve member of either one of aspects 14 or 15, wherein the valve head comprises a first end connected to the diaphragm portion and a second end located farther away from the diaphragm portion, and
wherein a diameter at the first end of the valve head is smaller than a diameter at the second end of the valve head.

Aspect 17. The valve member of any one of aspects 14-16, the valve head comprises a first end connected to the diaphragm portion and a second end located farther away from the diaphragm portion, and
wherein a side wall of the valve head is tapered when extending toward the second end of the valve head.

Aspect 18. The valve member of any one of aspects 14-17, wherein the one of PFA and FEP is a melt processable material.

Aspect 19. The valve member of any one of aspects 14-18, wherein the one of PFA and FEP has a melt flow rate of 0.4 g-50 g/10 min.

Aspect 20. The valve member of any one of aspects 14-19, wherein the PFA comprises a $C_{1-6}$ alkoxy group.

Aspect 21. The valve member of any one of aspects 14-19, wherein the PFA comprises a $C_{1-3}$ alkoxy group.

Aspect 22. The valve member of any one of aspects 14-21, wherein the MPTFE includes modified tetrafluoroethylene groups and unmodified tetrafluoroethylene groups, the MPTFE containing 5 wt % or less of the modified tetrafluoroethylene groups.

Aspect 23. A valve for controlling a flow of fluid, comprising:
a valve body comprising an inlet and an outlet for the fluid;
a passageway for the fluid that extends from the inlet to the outlet, the passageway comprising a valve seat; and
a valve member comprising:
a diaphragm portion formed of a non-melt processable material comprising a fluoropolymer, and
a valve head attached to the diaphragm portion, the valve head comprising an engagement portion engageable with the valve seat, the engagement portion formed of a melt processable material comprising a fluoropolymer,
wherein the valve head is moveable between an open position and a closed position relative to the valve seat.

Aspect 24. The valve of aspect 23, wherein an MIT flex life of the non-melt processable material is at least twice as great as an MIT flex life of the melt processable material.

Aspect 25. The valve of either one of aspects 23 or 24, wherein a MIT flex life of the non-melt processable material is at least one million.

Aspect 26. The valve of either one of aspects 23 or 24, wherein a MIT flex life of the non-melt processable material is at least two million.

Aspect 27. The valve of any one of aspects 23-26, wherein a melt flow rate of the melt processable material is at least 0.4 g/10 min.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A valve for controlling a flow of fluid, comprising:
a valve body comprising an inlet and an outlet for the fluid;
a passageway for the fluid that extends from the inlet to the outlet, the passageway comprising a valve seat; and
a valve member comprising a diaphragm portion and a valve head attached to the diaphragm portion, the diaphragm portion comprising at least one polymer selected from the group consisting of polytetrafluoroethylene, modified polytetrafluoroethylene, and ethylene tetrafluoroethylene, and the valve head comprising an engagement portion engageable with the valve seat, the engageable portion of the valve head comprising at least one polymer selected from the group consisting of perfluoroalkoxy alkane and fluorinated ethylene propylene, the at least one polymer selected from the group consisting of perfluoroalkoxy alkane and fluorinated ethylene propylene having a melt flow rate of 0.4 g-50 g/10 min,
wherein the valve head is moveable between an open position and a closed position relative to the valve seat.

2. The valve of claim 1, further comprising a valve stem attached to the valve member.

3. The valve of claim 2, wherein the valve stem comprises a flange engageable with an upper surface of the diaphragm portion, the diaphragm portion is pinched between the flange of the valve stem and valve head, and that the valve head is formed of the at least one polymer selected from the group consisting of perfluoroalkoxy alkane and fluorinated ethylene propylene.

4. The valve of claim 1, wherein the valve body comprises a groove, and the diaphragm portion comprises an insert receivable in the groove to form a seal between the passageway located on one side of the diaphragm portion and a space on an opposite side of the diaphragm portion.

5. The valve of claim 1, wherein the valve body comprises a retaining mechanism in contact with an upper surface of the diaphragm portion to restrict movement of the diaphragm portion.

6. The valve of claim 1, wherein the perfluoroalkoxy alkane comprises a $C_{1-6}$ alkoxy group.

7. A valve for controlling a flow of fluid, comprising:
a valve body comprising an inlet and an outlet for the fluid;
a passageway for the fluid that extends from the inlet to the outlet, the passageway comprising a valve seat; and
a valve member comprising a diaphragm portion and a valve head attached to the diaphragm portion, the diaphragm portion comprising at least one polymer selected from the group consisting of polytetrafluoroethylene, modified polytetrafluoroethylene, and ethylene tetrafluoroethylene, and the valve head comprising an engagement portion engageable with the valve seat, the engageable portion of the valve head comprising at least one polymer selected from the group consisting of perfluoroalkoxy alkane and fluorinated ethylene propylene,
wherein the modified polytetrafluoroethylene includes modified tetrafluoroethylene groups and unmodified tetrafluoroethylene groups, the modified polytetrafluoroethylene containing 5 wt % or less of the modified tetrafluoroethylene groups.

8. A valve member for a valve, comprising:
a diaphragm portion comprising one of polytetrafluoroethylene, modified polytetrafluoroethylene, and ethylene tetrafluoroethylene; and
a valve head attachable to the diaphragm portion, the valve head comprising an engagement portion configured to engage with a valve seat defined in the valve, the engageable portion of the valve head comprising at least one of perfluoroalkoxy alkane and fluorinated ethylene propylene, the at least one of perfluoroalkoxy alkane and fluorinated ethylene propylene having a melt flow rate of 0.4 g-50 g/10 min.

9. The valve member of claim 8, wherein the diaphragm portion includes an aperture and the valve stem extends through the aperture and is connected directly to the valve head.

10. The valve member of claim 8, wherein the valve head comprises a first end connected to the diaphragm portion and a second end located farther away from the diaphragm portion, and
wherein a diameter at the first end of the valve head is smaller than a diameter at the second end of the valve head.

11. The valve member of claim 8, the valve head comprises a first end connected to the diaphragm portion and a second end located farther away from the diaphragm portion, and
wherein a side wall of the valve head is tapered when extending toward the second end of the valve head.

12. The valve member of claim 8, wherein the PFA comprises a $C_{1-6}$ alkoxy group.

13. A valve member for a valve, comprising:
a diaphragm portion comprising one of polytetrafluoroethylene, modified polytetrafluoroethylene, and ethylene tetrafluoroethylene; and
a valve head attachable to the diaphragm portion, the valve head comprising an engagement portion configured to engage with a valve seat defined in the valve, the engageable portion of the valve head comprising at least one of perfluoroalkoxy alkane and fluorinated ethylene propylene,
wherein the modified polytetrafluoroethylene includes modified tetrafluoroethylene groups and unmodified tetrafluoroethylene groups, the modified polytetrafluoroethylene containing 5 wt % or less of the modified tetrafluoroethylene groups.

14. A valve for controlling a flow of fluid, comprising:
a valve body comprising an inlet and an outlet for the fluid;
a passageway for the fluid that extends from the inlet to the outlet, the passageway comprising a valve seat; and
a valve member comprising:
a diaphragm portion formed of a non-melt processable material comprising a fluoropolymer, and
a valve head attached to the diaphragm portion, the valve head comprising an engagement portion engageable with the valve seat, the engagement portion formed of a melt processable material comprising a fluoropolymer, the melt flow rate of the melt processable material being 0.4 g-50 g/10 min,
wherein the valve head is moveable between an open position and a closed position relative to the valve seat.

15. The valve of claim 14, wherein an MIT flex life of the non-melt processable material is at least twice as great as an MIT flex life of the melt processable material.

16. The valve of claim 14, wherein a MIT flex life of the non-melt processable material is at least one million.

17. The valve of claim 14, wherein a MIT flex life of the non-melt processable material is at least two million.

* * * * *